Aug. 23, 1927.
F. F. PETRICK
HOG WATERER
Filed July 26, 1926
1,640,292
2 Sheets-Sheet 1
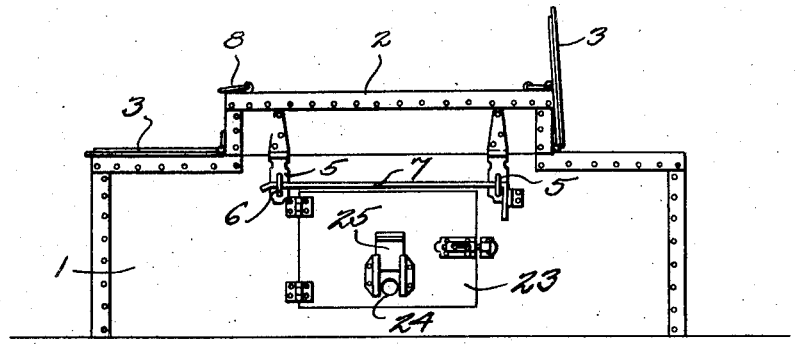
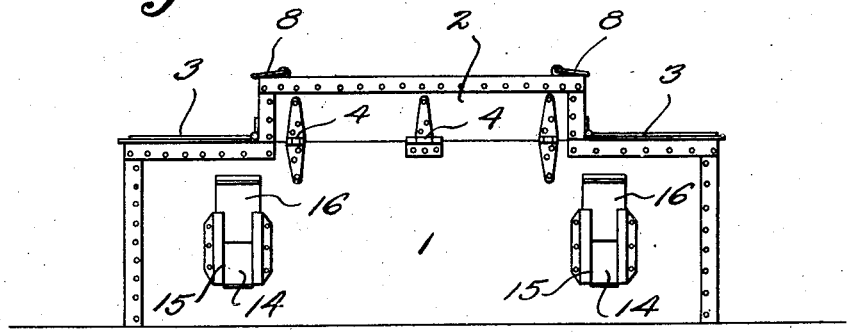
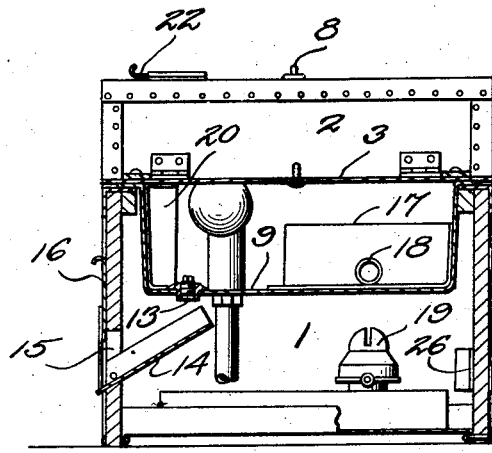
F. F. Petrick
INVENTOR
BY Victor J. Evans
ATTORNEY
WITNESS: R. E. Wise

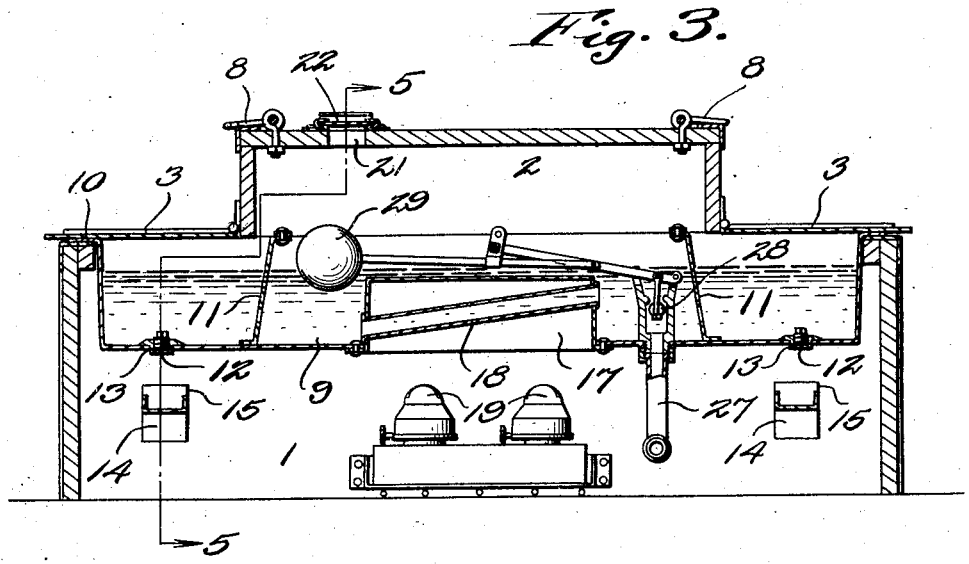

Patented Aug. 23, 1927.

1,640,292

UNITED STATES PATENT OFFICE.

FRANK F. PETRICK, OF WILSONVILLE, NEBRASKA.

HOG WATERER.

Application filed July 26, 1926. Serial No. 125,088.

This invention relates to a device for watering hogs and other animals, the general object of the invention being to provide means for heating the water in cold weather in such a manner that the water will be kept at a certain temperature with the minimum amount of fuel.

Another object of the invention is to provide the tank with settling chambers from which the animals drink, and which are provided with drain holes whereby the chambers can be easily cleaned.

A further object of the invention is to provide automatic means for keeping the water in the tank at a certain level.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the device showing one of the lids in raised position.

Figure 2 is a rear view of the device.

Figure 3 is a section on line 3—3 of Figure 4.

Figure 4 is a plan view with the lids removed.

Figure 5 is a section on line 5—5 of Figure 3.

In these views, 1 indicates a casing which has its top open, said top being normally closed by a box-like cover 2, which is of less length than the casing, and the lids 3, one of which is hinged to each end of the cover 2 and encloses an end part of the casing, it being seen that the cover 2 is arranged in the center of the casing. This cover 2 is hinged to one side of the casing by the hinges 4 and it is held in closed position by the hasps 5 engaging the staples 6 at the other side of the casing. A rod 7 passes through the staples to hold the hasps in locking position. Hooks 8 are arranged on top of the cover to engage eyes on the lids 3 to hold said lids in raised position. A tank or pan 9 is arranged in the casing and has its flange 10 engaging the upper edges of the casing so that the top of the casing is flush with the top of the pan. The pan is provided with perforated partitions 11 adjacent its ends which form settling chambers at the ends of the pan which are exposed when the lids 3 are raised. Thus the animals drink from these chambers and any mud or dirt washing off the mouths of the animals while drinking will be confined in the chambers by the partitions 11. This mud or dirt will settle to the bottoms of the chambers and by removing the plugs 12 in the openings 13 formed in the bottoms of the chambers, the chambers can be cleaned without difficulty. The mud and water passing through the holes 13 will fall upon the chutes 14 in the casing which discharge the material through the holes 15 formed in one side of the casing. These holes are closed by the slides 16. A dome 17 extends into the central part of the pan, with its bottom open and a tube 18 is inclinedly arranged in the dome, with its ends in communication with the pan so that some of the water in the pan will pass into the tube. Burners 19, of any suitable construction, are placed in the casing directly under the tube 18 so that said tube will be highly heated by the burners and thus a circulation of the water in the pan will be set up by the heating of the water in the tube. As the pan is of less dimensions than the casing, some of the heat from the burners will come in contact with the sides of the pan as well as the bottom so that the water in the pan will be heated by this heat as well as by the heat imparted to the tube 18 and the dome. The heat will finally escape through the vertical passage 20 formed at one side of the pan into the cover 2 and this heat will finally escape through the opening 21 in the top of the cover and which is controlled by a slide 22. The water will be further heated by the heat passing through the passage 20 and by passing over the surface of the water as it enters the spaces above the water in the pan.

Access to the burners is had through the door 23 in one side of the casing and air is admitted to the casing to support combustion through the opening 24 in said door which is controlled by the slide 25. A deflector 26 is arranged on the inner face of the door to prevent the air entering through the opening 24 from coming in direct contact with the flames of the burners, which might blow them out.

A supply pipe 27 is arranged to lead water into the pan and the supply of water is automatically controlled by means of the valve 28 and the float 29 which operates the valve in the usual manner.

From the foregoing, it will be seen that by opening the lids 3, the animals can have access to the settling chambers. These chambers act to confine any dirt dropping into the pan from contaminating the water in the main body of the pan and this dirt can be easily removed through the drain openings in the bottoms of the chambers. The arrangement of the heating means permits the water to be kept at a warm temperature with the minimum amount of fuel and the supply of water is automatically controlled by the float operated valve. The cover 2 protects the working parts at the center of the pan and can be readily removed when access to these parts is desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A watering device comprising a casing, a pan therein having its side walls spaced from the side walls of the casing with a passage for connecting the lower space of the casing with the space above the pan, a dome at the center of the pan, an inclinedly arranged tube passing through the dome with its ends in communication with the pan, heating means in the lower part of the casing under the dome, the products of combustion and heated air coming in contact with the bottom and sides of the pan and with the dome and the tube therein and passing upwardly through the passage to the space above the pan and means for permitting stock to drink from a portion of the pan.

2. A watering device comprising a casing, a pan having a flange at its top resting upon the upper edge of the casing, with the sides of the pan spaced from the inner walls of the casing, a dome at the center of the pan, an inclinedly arranged tube passing through the dome with its ends in communication with the pan, said pan having a vertical passage therein, heating means in the casing arranged directly under the tube, the products of combustion and heated air coming in contact with the bottom and sides of the pan and with the dome and passing through the passage to contact with the water in the pan, a cover for the central part of the casing having an opening therein for the outlet of the heated air, lids hinged to the cover for covering the end portions of the pan and a door in the casing for providing access to the heating means.

In testimony whereof I affix my signature.

FRANK F. PETRICK.